(12) United States Patent
McKay

(10) Patent No.: US 7,039,982 B1
(45) Date of Patent: May 9, 2006

(54) LINT ROLLER/BRUSH ASSEMBLY

(75) Inventor: William D. McKay, Grand Blanc, MI (US)

(73) Assignee: The Hartz Mountain Corporation, Secaucus, NJ (US)

( * ) Notice: Subject to any disclaimer, the term of this patent is extended or adjusted under 35 U.S.C. 154(b) by 0 days.

(21) Appl. No.: 10/329,717

(22) Filed: Dec. 26, 2002

Related U.S. Application Data

(63) Continuation-in-part of application No. 10/302,038, filed on Nov. 22, 2002, now Pat. No. 6,763,977, which is a continuation-in-part of application No. 10/143,396, filed on May 10, 2002, now Pat. No. 6,698,626.

(60) Provisional application No. 60/426,589, filed on Nov. 15, 2002.

(51) Int. Cl.
A46B 13/00 (2006.01)

(52) U.S. Cl. ............................. 15/104.002; 15/230.11; 492/13

(58) Field of Classification Search ........... 15/104.002, 15/230.11; 16/422; D04/430–431, 121–122, D04/124–126; 492/13–14, 19
See application file for complete search history.

(56) References Cited

U.S. PATENT DOCUMENTS

| | | | |
|---|---|---|---|
| 2,127,163 A | 8/1938 | Davis | |
| 2,177,064 A * | 10/1939 | Harsted | 43/23 |
| 2,271,189 A | 1/1942 | Garthwait | |
| 2,506,333 A | 5/1950 | Bedynek | |
| 2,612,336 A | 9/1952 | Tuttle | |
| 2,758,327 A * | 8/1956 | Kennon | 15/104.002 |
| 3,011,499 A | 12/1961 | Tajan | 401/139 |
| 3,056,154 A | 10/1962 | Neal | 15/104 |
| 3,102,544 A | 9/1963 | Keegan et al. | 132/147 |
| 3,158,887 A | 12/1964 | Kanbar et al. | 15/104 |
| 3,189,069 A * | 6/1965 | Stowell | 81/177.1 |
| 3,299,461 A | 1/1967 | Marks | 15/104 |
| 3,373,457 A | 3/1968 | Rouch, Jr. | 15/104 |
| D216,942 S | 3/1970 | Safalow | |
| 3,665,543 A | 5/1972 | Nappi | 15/215 |
| D238,127 S | 12/1975 | Snyder | |
| 3,986,226 A * | 10/1976 | Roe et al. | 15/230.11 |
| 4,062,083 A | 12/1977 | McKay | 15/106 |
| 4,107,811 A | 8/1978 | Imsande | 15/215 |
| 4,244,587 A | 1/1981 | Schweizer | 15/104.8 |
| 4,335,487 A | 6/1982 | DiPierro et al. | |
| 4,361,923 A | 12/1982 | McKay | 15/104 |
| 4,399,579 A | 8/1983 | McKay | 15/104 |
| 4,422,201 A | 12/1983 | McKay | 15/104 |
| 4,489,912 A | 12/1984 | Haythornthwaite | |
| 4,519,566 A | 5/1985 | Manzi | |
| 4,727,616 A | 3/1988 | Kucera et al. | 15/104 |
| 4,742,547 A | 5/1988 | Watanabe | 15/104 |
| 4,850,073 A | 7/1989 | Preuss | 15/207.2 |
| 4,905,337 A | 3/1990 | McKay | 15/104 |
| D311,995 S | 11/1990 | Garcia | |

(Continued)

Primary Examiner—Frederick C. Nicolas
(74) Attorney, Agent, or Firm—Gottlieb, Rackman&Reisman

(57) ABSTRACT

A lint/pet hair roller assembly includes a body supporting a tubular adhesive lint remover roller and/or a stationary directional lint brush fabric. The assembly includes a handle section and a roller support section. The support section has an outer diameter less than the diameter of the adhesive lint roll or a directional fabric wrapped about the support section. The elongated handle section receives a separate rubber cushion and an optional decorative top including a hanger. Alternately, an arm projects from the body and receives an additional cleaning element. Alternately, a dispenser is carried on the handle for dispensing fluid from a storage chamber carried in the handle. Alternately, a squeegee is alternately carried in the support.

20 Claims, 11 Drawing Sheets

U.S. PATENT DOCUMENTS

| | | | |
|---|---|---|---|
| 4,969,231 A * | 11/1990 | Mader et al. ................. 16/421 |
| D314,282 S | 2/1991 | Gingras |
| 5,027,465 A | 7/1991 | McKay ........................ 15/104 |
| D320,680 S | 10/1991 | Stetson et al. ............. D30/158 |
| D342,610 S | 12/1993 | Stetson et al. ............... D4/122 |
| 5,388,700 A | 2/1995 | Per-Lee |
| D363,214 S | 10/1995 | Parola et al. ................ D9/300 |
| 5,819,989 A | 10/1998 | Saraceni ..................... 221/192 |
| 5,878,457 A | 3/1999 | Cox et al. ............. 15/104.002 |
| 5,887,315 A | 3/1999 | Rogers |
| 5,940,921 A | 8/1999 | Wood et al. |
| D419,306 S | 1/2000 | Hansen et al. |
| 6,014,788 A | 1/2000 | Jaffri ..................... 15/104.002 |
| 6,055,695 A | 5/2000 | McKay, Jr. ............ 15/104.002 |
| 6,127,014 A | 10/2000 | McKay, Jr. ................. 428/43 |
| D441,538 S | 5/2001 | Petner |
| 6,233,856 B1 | 5/2001 | Haugk et al. |
| D446,023 S | 8/2001 | Sherman |
| 6,298,517 B1 | 10/2001 | McKay ........................ 15/228 |
| 6,321,408 B1 | 11/2001 | Esterson et al. |
| 6,325,070 B1 | 12/2001 | Tyroler et al. .............. 132/112 |
| D489,185 S | 5/2004 | Kemp et al. |
| 6,756,102 B1 | 6/2004 | Galo |
| 6,763,977 B1 | 7/2004 | McKay |
| 2002/0124864 A1 | 9/2002 | Gross et al. |
| 2002/0144367 A1 | 10/2002 | McKay, Jr. |
| 2003/0096074 A1 | 5/2003 | Kim |
| 2003/0183241 A1 | 10/2003 | Kemp et al. |
| 2003/0183242 A1 | 10/2003 | Kemp et al. |
| 2004/0154133 A1 | 8/2004 | Polzin et al. |
| 2004/0187889 A1 | 9/2004 | Kemp et al. |
| 2004/0194240 A1 | 10/2004 | McKay, Jr. |

* cited by examiner

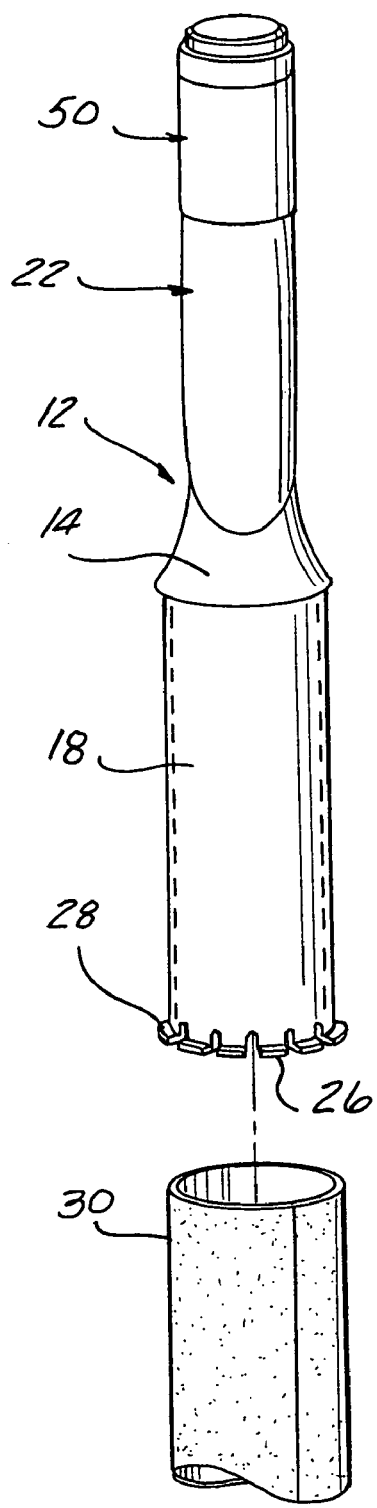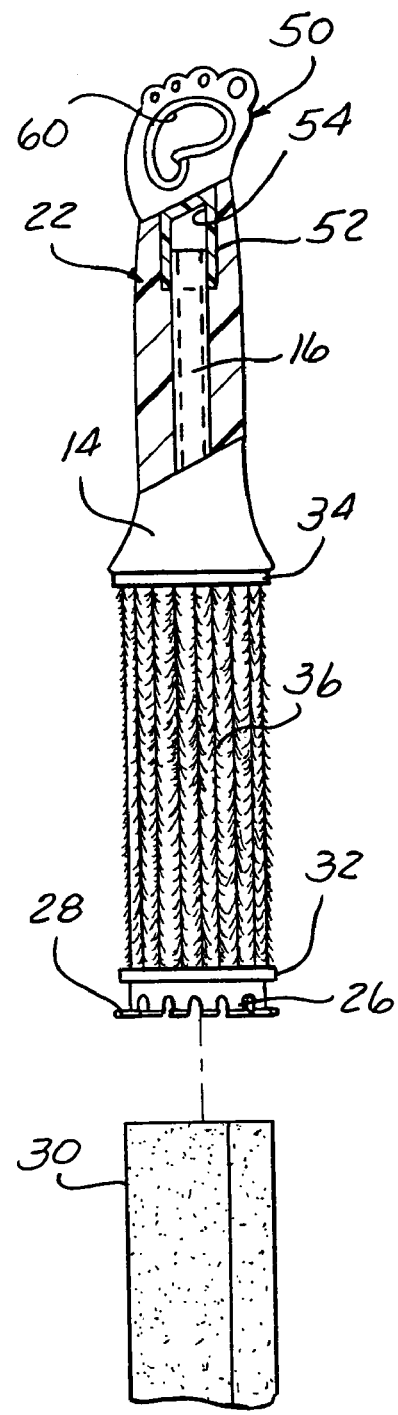
FIG. 1
FIG. 3

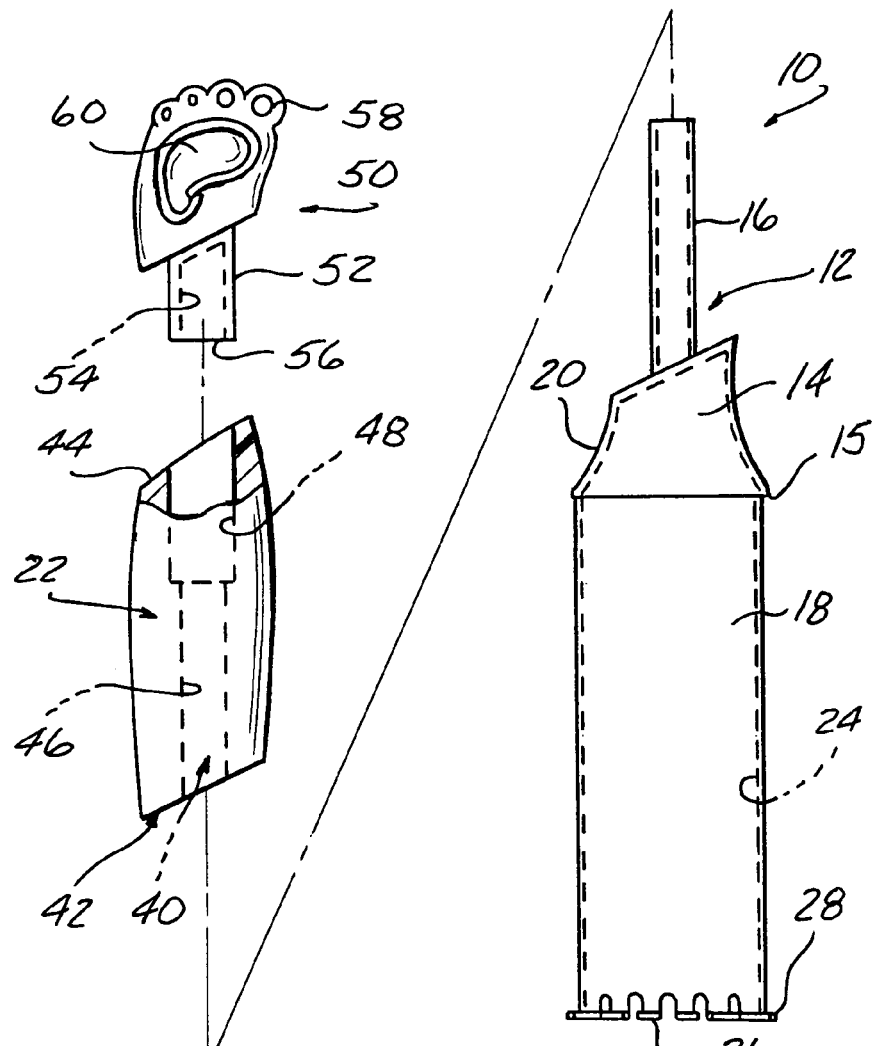
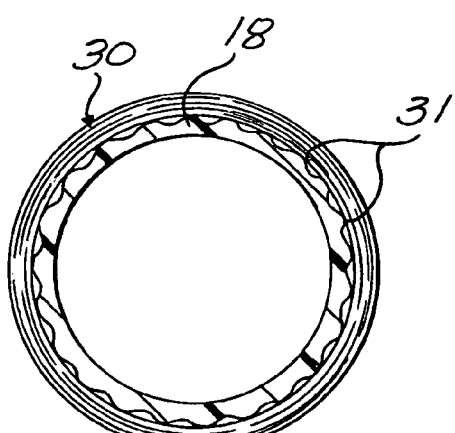
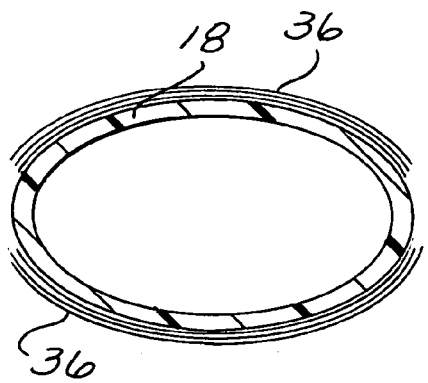
FIG. 2
FIG. 5
FIG. 6

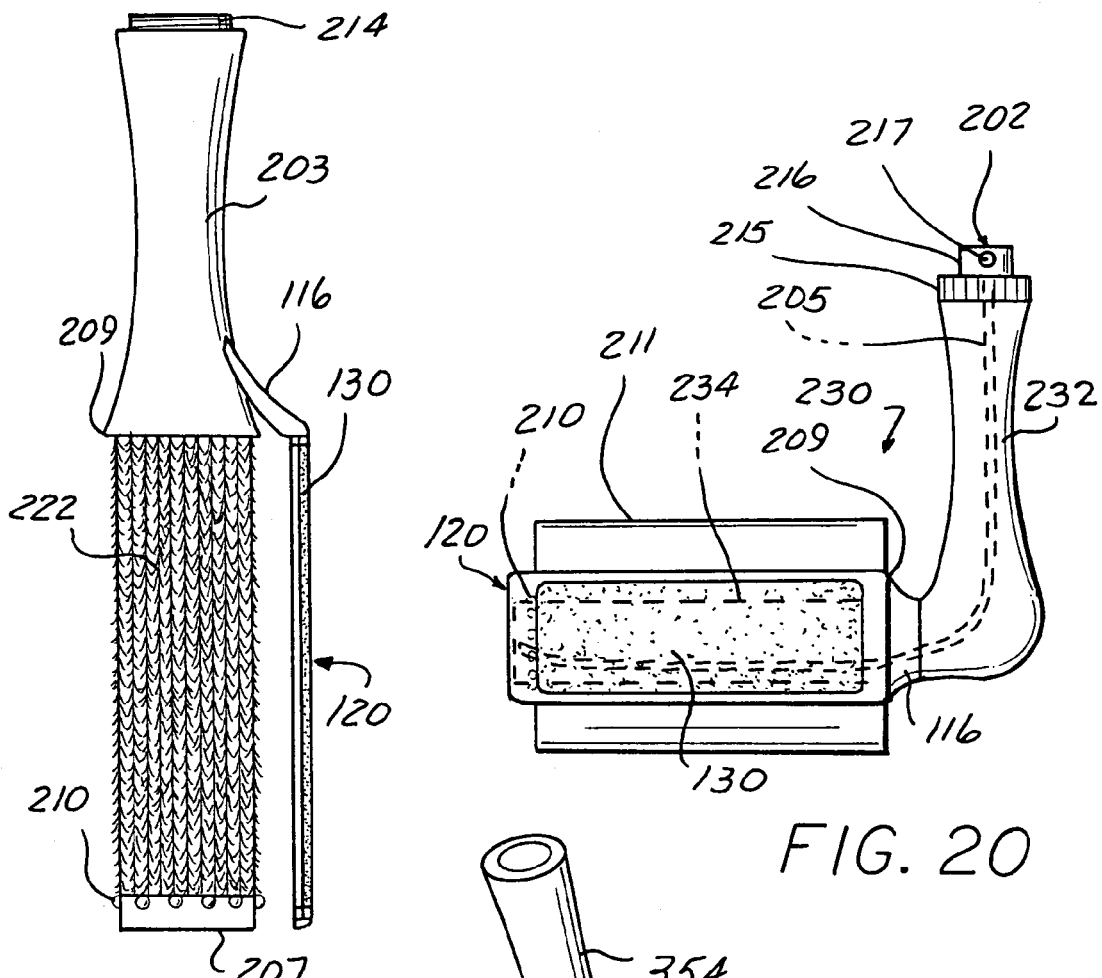
FIG. 17
FIG. 20
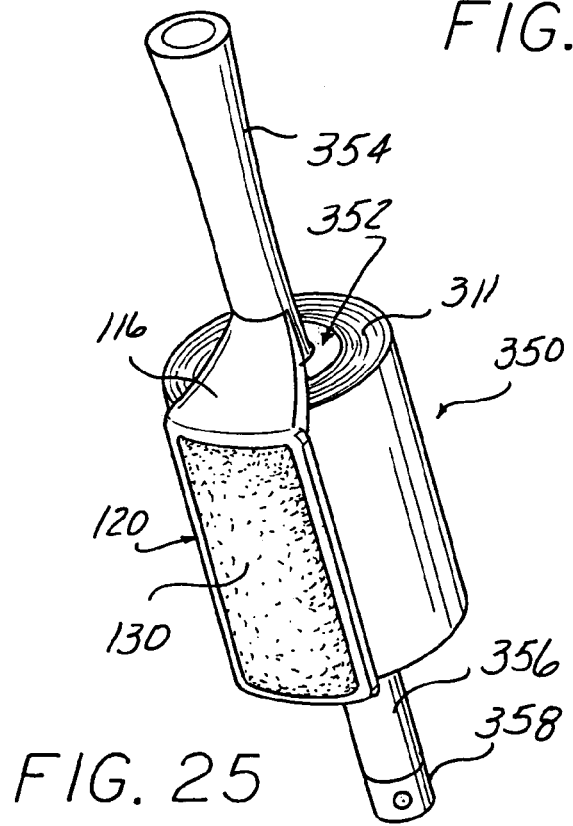
FIG. 25

LINT ROLLER/BRUSH ASSEMBLY

CROSS REFERENCE TO CO-PENDING APPLICATION

This application claims the benefit of the priority filing date of U.S. Provisional Application Ser. No. 60/426,589, filed Nov. 15, 2002, the contents of which are incorporated herein in its entirety, and is a continuation-in-part of U.S. application Ser. No. 10/302,038, filed Nov. 22, 2002, now U.S. Pat. No. 6,763,977, which is a continuation-in-part of U.S. patent application Ser. No. 10/143,396, filed May 10, 2002, now U.S. Pat. No. 6,698,626, the contents of both of which are incorporated herein in their entirety.

BACKGROUND

The present invention relates to a lint roller assembly.

There are many previously known lint roller assemblies. These previously known lint roller assemblies typically comprise a handle secured to a cylindrical lint roller support. A tubular cylindrical adhesive lint roller is then removably mounted to the support such that the adhesive roller is rotatively relative to the handle. In use, the adhesive lint roller is rolled along a surface to remove unsightly particles, lint, pet hair, etc.

The previously known lint roller assemblies have used a number of different options to rotatively secure the lint roller support to the handle. For example, in U.S. Pat. No. 4,361,923, the lint roller support and handle are separately constructed and then rotatively secured together. One disadvantage of this type of previously known lint roller assembly, however, is that the rotatively connection between the handle and lint roller support is subject to mechanical failure. Another drawback is that a directional lint fabric cannot be attached to the rotatable support section and still be operable. It rotates with the support and is not stationary to provide for brushing motion.

A further disadvantage to this type of assembly is that both the lint roller support and the handle are separately molded from plastic and then assembled together requiring two separate molds, one for each part.

Still other types of lint roller assemblies, such as that disclosed in U.S. Pat. No. 6,055,695, the lint roller handle includes a pair of elongated housing parts, which are substantially identical to each other. A disadvantage to this type of assembly is that each housing part must be snapped exactly into the other perfectly registering using pins and sockets. A further disadvantage is that the handle section being integral to the support section is manufactured with rigid plastic material and uncomfortable to grip and does not provide for a customized plastic decorative top or hanger.

Still other types of previously known lint roller assemblies, such as that disclosed in U.S. Pat. No. 4,557,011, utilize a unitary lint roller handle and lint roller support. These previously known lint roller assemblies, however, require a complex and, therefore, expensive mold design in order to mold the lint roller handle and support. Furthermore, a relatively large frictional engagement between the lint roller and the lint roller support often times interferes with the desired free rotation of the lint roller about the lint roller support. Further, it does not provide for mounting a directional lint brush fabric under the rotatable tape roll.

SUMMARY

The present invention is a lint roller assembly which overcomes the abovementioned disadvantages of the previously known art.

In brief, the lint roller assembly of the present invention is a unitary formed lint remover including an adhesive tape roll sleeve engaging a hollow support cylinder having an integral handle support portion extending axially outwardly from one end.

A section of directional lint cloth can optionally be placed within at least two raised sections of radially running plastic bearing ridges to which an adhesive tape roll sleeve is provided for selective rotation, thereon upon movable contact across a surface being cleaned. The adhesive tape roll sleeve can be selectively removed from the support cylinder to access the lint brush fabric, then replaced for further use.

A plurality of resiliently mounted, radially extending, adhesive tape roll sleeve engaging fingers or flange elements are provided along the open outer end of the hollow support cylinder in spaced apart axially aligned registry with an annular stop flange so as to selectively retain the adhesive tape roll sleeve assembly there between while permitting rotative movement thereof in the support cylinder.

The outer surface of the hollow support cylinder is selectively provided with at least two spaced apart annular bearing ridges which are adapted to slidingly engage the inner surface of the adhesive tape roll sleeve assembly mounted on the hollow support cylinder so as to facilitate relative selective rotative movement of the sleeve assembly with respect thereto.

The integral handle support section extending axially outwardly from one end thereof is connected to a cap, optionally a decorative top, using a frictional fit or adhesive. In one aspect of the present invention, the handle support section has a smaller diameter than the hollow cylindrical base of the cap and fits inside of the hollow base of the cap. Prior to snapping the cap in place in the handle, a rubber insert tube or strips of rubber are placed around the handle section for cushioning the user's hand.

In still another aspect, the directional lint cloth fabric is omitted along with the spaced apart annular bearing ridges. In order to minimize the frictional contact between the lint roller support and the adhesive lint roller sleeve, a plurality of circumferentially spaced and longitudinally extending ribs are formed along the outer periphery of the lint roller support. Since only the outer periphery of the ribs contact the inner periphery of the lint roller sleeve, only a minimal frictional contact between the interior of the lint roller and the outer periphery of the lint roller support occurs thus facilitating rotation of the lint roller sleeve about the support section.

In still another aspect of the present invention, the hollow support section is oval in shape to accept to strips of directional lint brush fabric; one on the front and the other on the backside.

In another aspect of the present invention, the support portion of the body is in the form of an arm extending from the handle. First and second lint roll support members extend from the arm and are adapted for receiving a lint roll therebetween.

In another aspect of the invention which is usable with most previously described aspects, an arm extends from the body and is spaced from the support portion of the body. An additional cleaning element is carried on the arm for added cleaning functionality of the present apparatus.

In still another aspect which is usable with many of the previously described aspects of the invention, a liquid storage chamber is formed in the body. A dispenser means is disposed in fluid communication with the liquid storage chamber for dispensing liquid from the body to assist in cleaning operations.

The apparatus of the present invention provides added functionality in lint and other debris removal operations by providing multiple cleaning surfaces or elements in a single tool. Each cleaning element is usable separately so as to enable most types of dirt, lint, debris, etc., to be effectively removed from various surfaces, fabric, clothes, furniture, animals, etc.

BRIEF DESCRIPTION OF THE DRAWING

The various features, advantages and other uses of the present invention will become more apparent by referring to the following detailed description and drawing in which:

FIG. 1 is a side elevational view of one aspect of a lint roller/brush assembly of the present invention;

FIG. 2 is an exploded side elevational view of an alternate assembly according to the present invention;

FIG. 3 is a partially cross-sectioned, side elevational view of lint roller/brush assembly of the present invention;

FIG. 5 is a lateral cross-sectional view of an alternate tape support section;

FIG. 6 is a lateral cross-sectional view of yet another fabric support section;

FIG. 17 is a side elevational view of another aspect of the combination lint roller/brush assembly and spray dispenser apparatus of the present invention with directional lint removal fabric attached to one or more sides;

FIG. 20 is a side elevational view showing an alternate aspect of the apparatus according to the present invention;

FIG. 25 is a perspective view of another aspect of the present apparatus;

DETAILED DESCRIPTION

Figure 4:
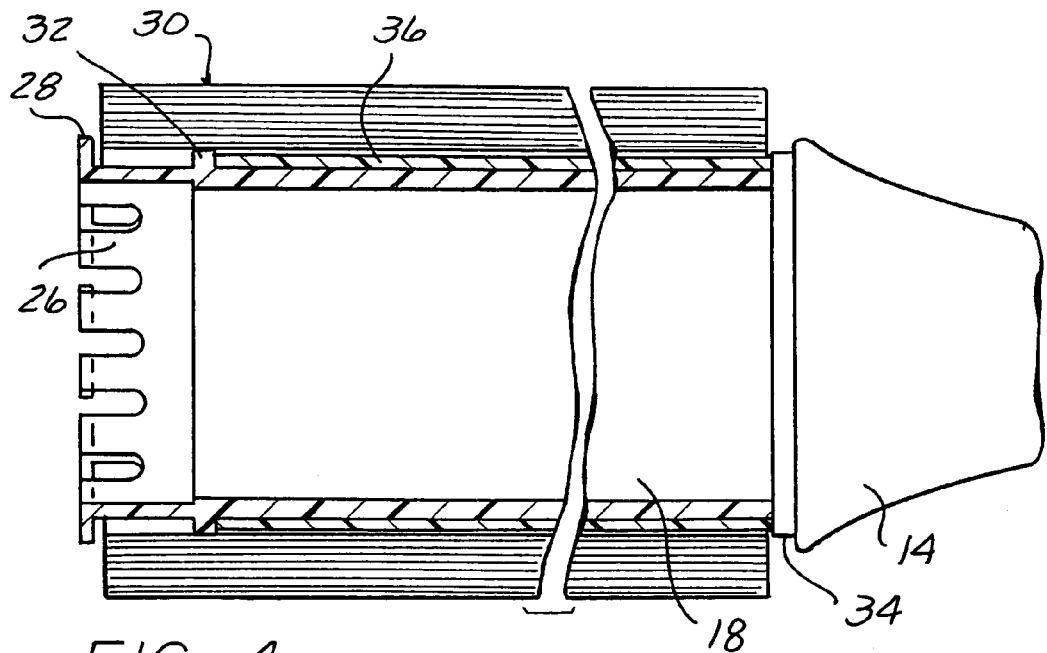
FIG. 4 is a longitudinal cross-sectional view taken along line 4—4 in FIG. 3.

Referring now to FIGS. 1 and 2, there is depicted a lint roller/brush assembly 10 constructed in accordance with the teachings of one aspect of the present invention.

The assembly 10 includes a unitary, one piece molded plastic body 12 which includes a base 14 from which extends a handle support 16 and tape or fabric support 18. By way of example only, the base 14 is hollow as is the tape support 18. The handle support 16 may be hollow or solid.

The base 14 has a profiled shape, such as one with smoothly tapering or curved sides 20 for aesthetic purposes as well as to smoothly merge the enlarged end 15 of the base 14 with the generally smaller diameter handle 22 mounted on the handle support 16.

The tape or fabric support 18 preferably defines a generally cylindrical tubular member which is illustrated as being hollow with a side wall 24, by example only. In FIGS. 3 and 4, plurality of axially extending fingers 26 are formed in an end of the support 18 opposite from the end which merges with the base 14. The ends 28 of the fingers 26 extend radially outward from a longitudinal axis extending through the tape support 18. The fingers define a resilient means for capturing a tape roll 30 on the tape support 18.

In use, the tape roll 30, which may be any commercially available tape roll having outwardly facing adhesive sheets or strips, generally arranged in a plurality of sheets wound in a roll wherein the outermost sheets are peelable from the roll, one at a time, along perforated edges of each sheet, is forced over the enlarged diameter of the ends 28 of the fingers 26 causing the fingers 26 to bend radially inward to allow passage of the inner surface of the roll 30 or the inner surface of a core in the roll 30, if a core is employed, over the ends 28 of the fingers 26. As shown in FIG. 4, when the roll 30 is completely mounted on the support 18, it may freely rotate under applied force to remove lint, pet hair, and other debris from surfaces, such as clothes, furniture, or other fabrics. Easier rotation of the roll 30 maybe achieved by use of longitudinally extending spaced ribs 31 which minimizes frictional contact with the inner surface of the roll 30.

At the same time, as shown in FIG. 4, the outermost dimension of the diametrically opposed ends 28 of the fingers 26 is greater than the inner diameter of the roll 30 thereby enabling the fingers 26 to retain the roll 30 on the tape support section 18.

At any time, the roll 30 may be removed by forcing it over the ends 28 of the fingers 26 thereby exposing the directional fabric 36 for use. The tape roll 30 may then be reapplied as necessary to the tape support 18 as described above.

The handle support section 16 is designed for receiving a suitably formed handle 22. The support section 16 and the handle 22 may be integrally formed as a one piece extension with the base 14 and have a smoothly curved, ergonomic shape for easy gripping by a human hand. In one aspect of the present invention, the handle 22 is formed of one or more sections of a resilient material, such as a resilient elastomer or rubber, which is frictionally or adhesively fixed to the handle support 16. As shown in FIG. 3, in one example, the handle 26 is formed as a one piece body having a through bore 40 extending from a first end 42 to an opposed second end 44. The bore 40 includes a first smaller diameter bore portion 46 for registry with the exterior surface of the handle support 16 and a larger diameter bore portion 48 which extends from one end of the handle support 16 as shown in FIG. 1. The second bore portion 48 opens to the second end 44 of the handle 22. Likewise, the smaller diameter bore portion 46 opens to the first end 42 of the handle 22 allowing the handle 22 to be slid over the handle support 16 and held in place with respect to the handle 16 by a tight friction fit and/or by the use of adhesives.

According to one aspect of the present invention, an end cap denoted by reference number 50 is applied over the second end 44 of the handle 22. Although a decorative end cap 50 is shown in FIGS. 1–3, it will be understood that the end cap 50 may take any other shape, including a simple flat or arcuate shape to form an aesthetic shape on the end of the handle 22.

In the decorative shape for the end cap 50 shown in FIG. 3, the end cap 50 has a hollow shank portion 52 in which a bore 54 extends from a first end 56. The shank 52 has an outer diameter so as to register with the inner diameter of the bore portion 48 in the handle 22 to enable the end cap 50 to be mounted to the handle 22 by means of a tight friction fit and/or through the use of adhesive. The opposite end 58 of the end cap 50 is formed with a decorative shape.

In one aspect of the invention, the end portion 58 of the end cap 50 is formed with a hanger 60 to enable the entire lint roller/brush assembly 10 to be hung from a peg or projection in a marketing stand or rack and even by the end user during periods of non-use. The hanger portion 60 may comprise a closed aperture as shown in FIGS. 1–3 as well as an open ended aperture.

A first bearing ridge 32 is formed on the tape support 18 closely spaced from the fingers 26. The first bearing ridge 32 defines an annular member having an outer diameter larger than the diameter of the tape support 18, but slightly smaller than the outer diameter of two diametrically opposed ends 28 of the fingers 26. A second bearing ridge 34 is formed on one end of the base 14. A tape roll 30 having a core or being of the coreless type on the tape support 18, with an inner surface of the tape roll 30 rotatably engaging the bearing surfaces 32 and 34, but spaced from an outer surface of the tape support 18. This enables a section of directional cloth or fabric 36 to be fixedly mounted on the support 18 for use separately from the tape roll 30 when the tape roll 30 is removed from the support 18. The fabric 36 is, by example, a dimensional woven nylon pile velvet created by cutting intertwined yard threads. The pile surface is heat set in a specific direction to provide directional uniformity. This enable the fabric 36 to be drawn in one direction across a surface to be cleaned to pickup lint, pet hair, and other debris from the surface. Dragging the fabric 36 in an opposite direction across another surface removes any collected lint and debris from the fabric 36.

The section of directional fabric may be wound and frictionally or adhesively joined to the tape support 18. Alternately, the directional fabric 36 may comprise multiple sections each adhesively adhered to the exterior of the tape support 18.

The hollow support section 18 may have an oblate or oval shape as shown in FIG. 6 to accept strips of directional fabric, one on one side and one on an opposed side. Even though the tape support 18 may have an oblate shape, the first and second bearing surfaces 32 and 34 should be substantially circular to allow easy rotation of a tape roll 30 thereover with minimal frictional engagement.

In FIG. 2, the directional fabric 36 may be omitted or used by itself. The first and second bearing surfaces 32 and 34 are eliminated. The inner surface of the tape roll 30 may then be placed directly over a suitably dimensioned tape support 18 which allows low frictional rotation of the tape roll 30 about the tape support 18 while the tape roll 30 is longitudinally held in place on the assembly 10 by the fingers 26 and one end 15 of the base 14.

Figure 7:
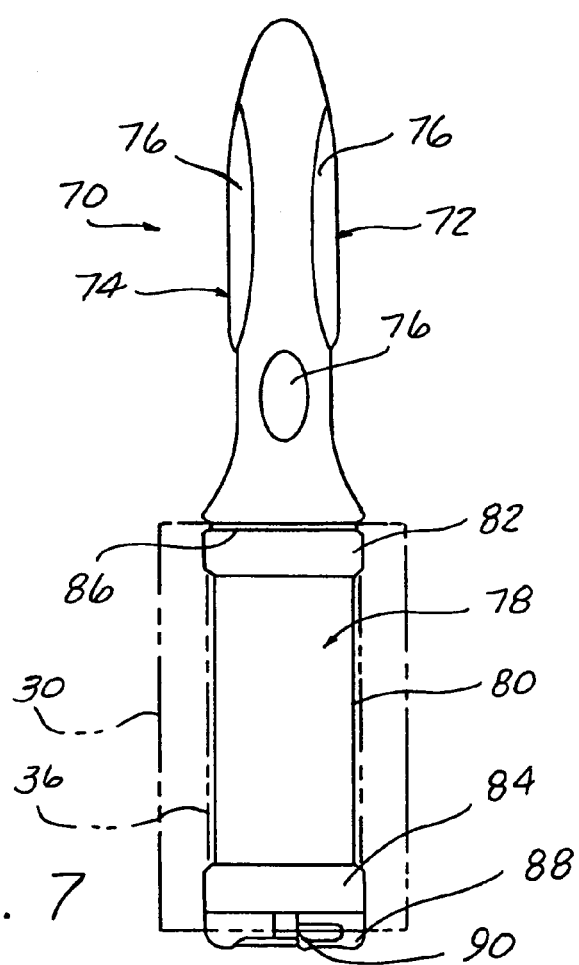
FIG. 7 is a side elevational view of a modified version of the lint roller/brush assembly shown in FIG. 3.

Referring now to FIG. 7, there is depicted a modified version of the assembly 10 shown in FIG. 3. In this aspect of the invention, the lint roller/brush assembly 70 also includes a one-piece body 72 which can be formed of a blow molded plastic. The body 72 includes a handle portion 74 which may contain resilient inserts 76 as described above.

The handle portion 74 integrally transitions into a tape roll support section 78 which has an inner elongated generally cylindrical portion 80 for supporting the directional fabric cloth layer 36. Enlarged diameter bearing surfaces 82 and 84 are disposed on opposite ends of the inner portion 80 and have a larger diameter for rotatably supporting the tape roll 30 thereover, with an inner diameter of the tape roll 30 spaced from the directional fabric 36. The bearing surface 82 is disposed adjacent to an enlarged shoulder 86 which acts as a stop edge for one end of the tape roll 30. The opposite end of the support section 78, axially adjacent to the bearing surface 84 is formed with a plurality of radially outward extending fingers or projections 90. The fingers 90 are bendable or expand the roll 30 upon insertion of a tape roll 30 thereover to enable the tape roll 30 to be slid over the support section 78 into engagement with the bearing surfaces 82 and 84. The fingers 90 trap the tape roll 30 on the support section 78.

Referring now to FIGS. 8–14, there are depicted two additional aspects of the present invention which provide an additional cleaning capability to the assembly 10 by providing a support for an additional debris removal surface or cleaning element, such as a sponge, bristles, directional fabric cloth, etc.

Figure 8:
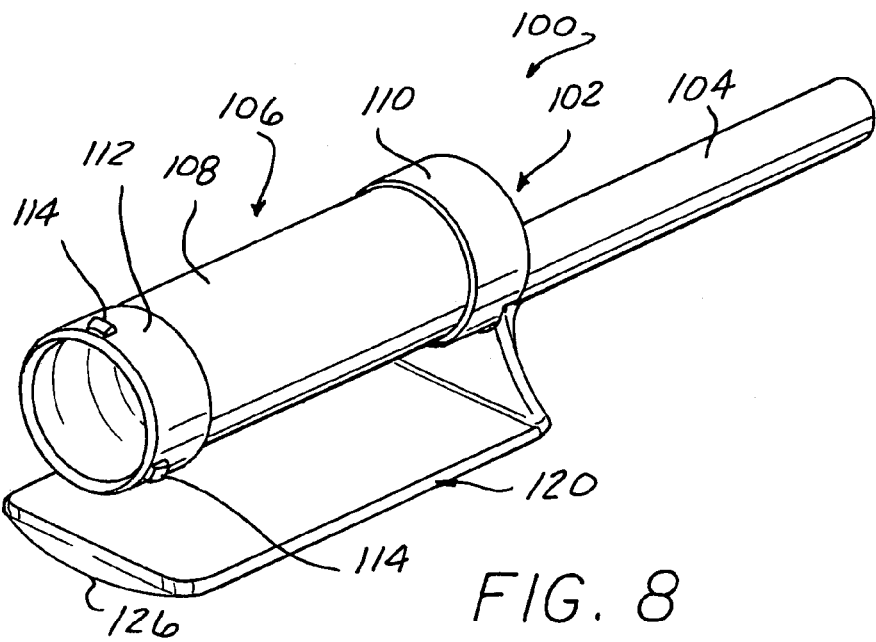
FIG. 8 is a perspective view of the present lint roller/brush assembly.
Figure 9:
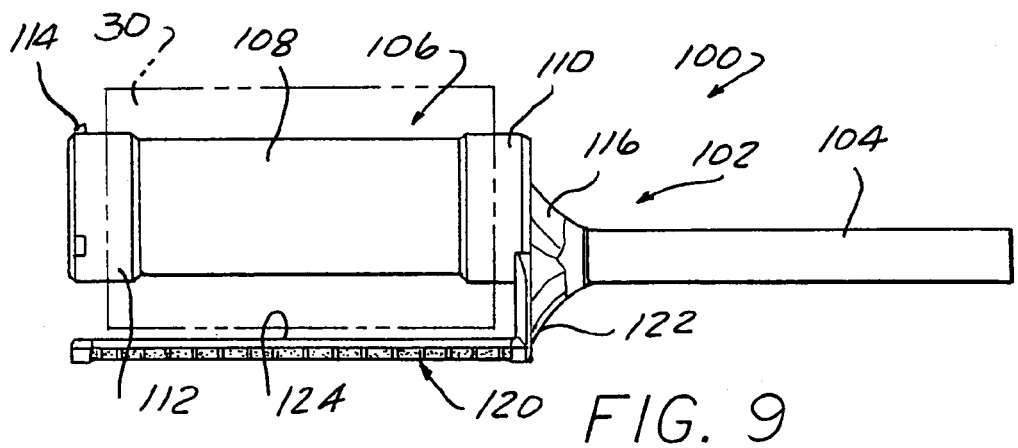
FIG. 9 is a side elevational view of the lint roller/brush assembly shown in FIG. 8.
Figure 10:
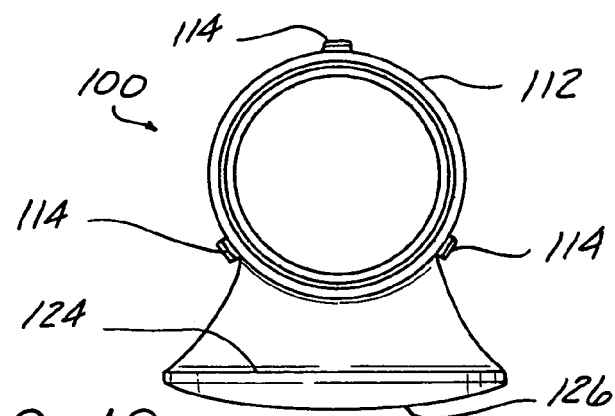
FIG. 10 is a left end view of the lint roller/brush assembly shown in FIGS. 8 and 9.
Figure 11:
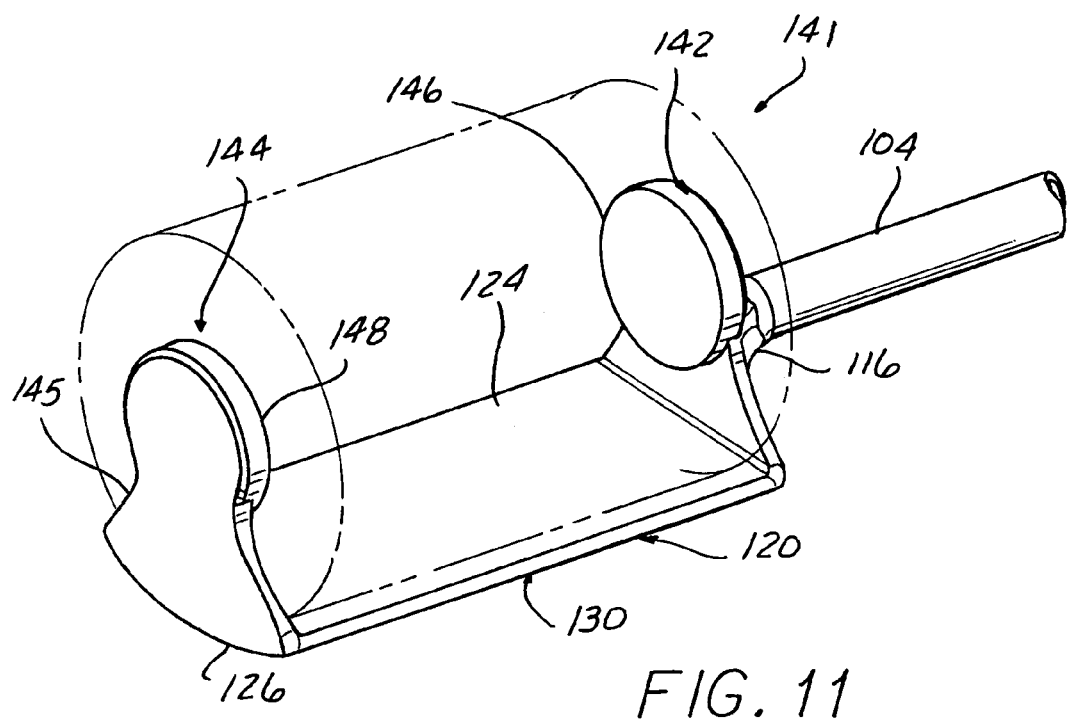
FIG. 11 is a perspective view of another aspect of a lint roller/brush assembly according to the present invention.

As shown in the aspect depicted in FIGS. 8–10, an assembly 100 preferably is formed as an integral, one piece body of blow molded or injection molded plastic. The body 102 includes a handle portion 104 of any suitable grippable cross section. The use of resilient elements on the handle portion 104, such as the resilient elements 76 shown in FIG. 7, are not depicted in FIG. 8 for reasons of clarity. It will be understood that the handle portion 104 may include such resilient gripping elements 74 as well as the hanger 50 shown in FIG. 3.

A support section 106 extends axially from the handle portion 104 and includes a central cylindrical portion 108 of a first diameter and spaced end bearing surfaces 110 and 112 of larger diameter. A plurality of radially extending resilient fingers or projections 114 are formed adjacent the end of the bearing surface 112. The support section 106 functions in the same manner as the support section 78 described above and shown in FIG. 7 in that a directional fabric cloth or layers may be provided on the central portion 108 separate from a lint roll 30 mounted on the bearing surfaces 110 and 112.

As shown in FIGS. 8 and 9, the handle portion 104 may be radially offset from a longitudinal axis through the support section 106 or disposed coaxially with the longitudinal axis of the support section 106. A transition zone 116 integrally connects the handle portion 104 with the support section 106.

According to a unique feature of this aspect of the invention, a support or arm 120 is integrally connected to the transition section 116, for example, or fixedly secured as a separate element to the body 102 by means of sonic or head weld, adhesive, etc.

The support 120 is in the form of a hood or shield which extends generally in parallel with the longitudinal axis of the support section 108 and substantially over the entire length of the support section 106. However, as shown in FIGS. 8–10, the support 120 is spaced from the cylindrical portion 108 of the support section 106 to allow a full size lint roll 30 to be disposed therebetween without interference.

By example only, the support 120 is in the form of a generally arm-like member cantilevered from one end 122 which joins the support 120 to the transition portion 116 of the body 102. By example only, a radially inner surface 124 is formed on the support 120 with a generally planar or flat configuration. Again by example, the opposed outer surface of the support 120 has a generally curved or arcuate cross section 126 to provide a more effective or useful cleaning surface.

Figure 12:
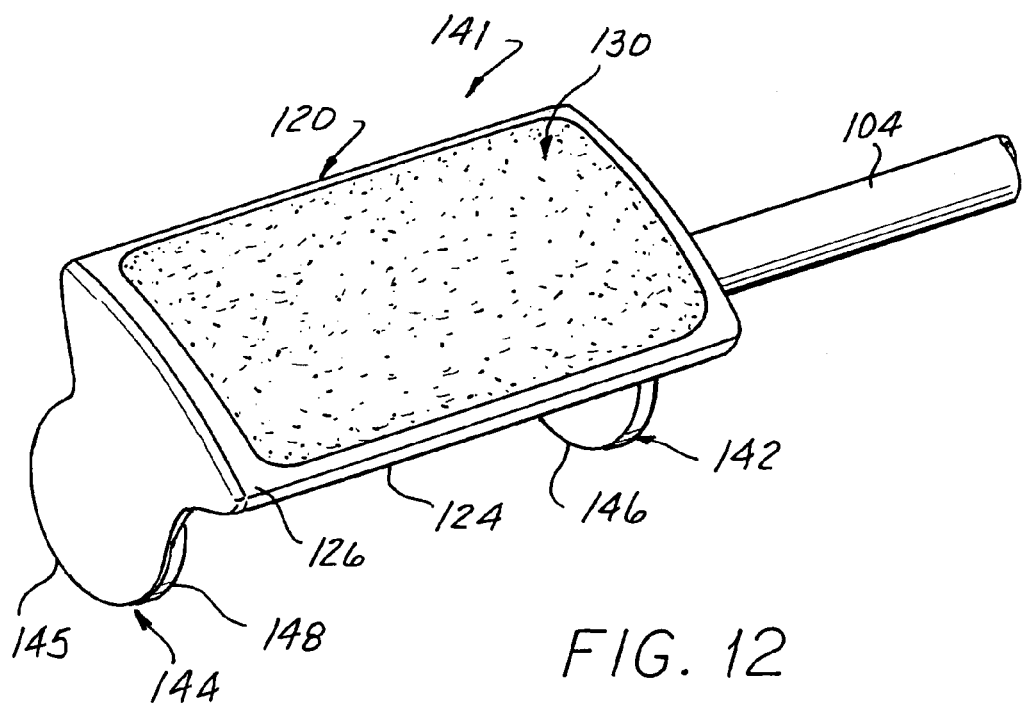
FIG. 12 is a bottom perspective view of the lint roller/brush assembly shown in FIG. 11.
Figure 13:
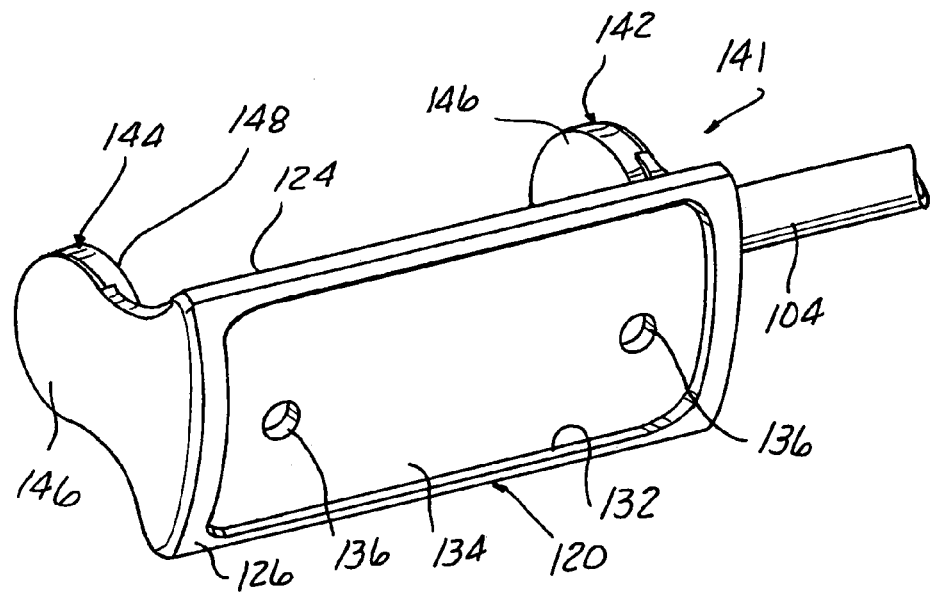
FIG. 13 is a perspective view of the lint roller/brush assembly shown in FIG. 12, but with the cleaning element removed.
Figure 14:
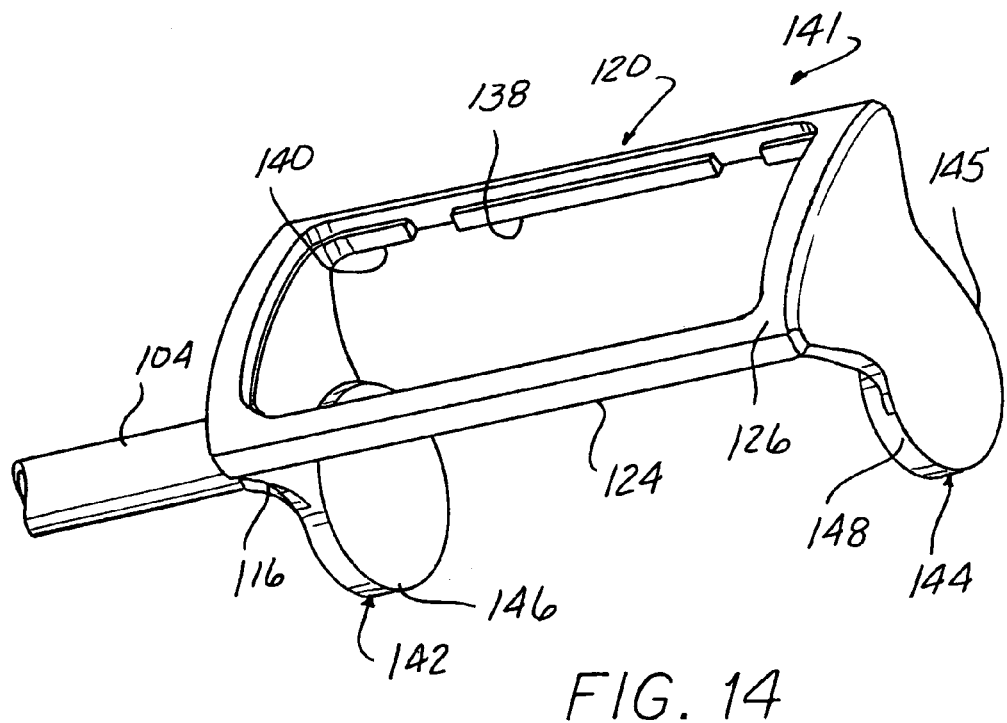
FIG. 14 is a perspective view of a modification to the lint roller/brush assembly shown in FIGS. 11–13.

Referring briefly to FIGS. 12–14, a brush or cleaning element denoted generally by reference number 130 is mounted in the support 120. The brush or cleaning member 130 may take the form of sponge, sponge rubber, foam or other resilient elastomeric material which has a slightly sticky outer surface, as well as bristles, and directional fabric mounted on a substrate which is attachable to the radially outer surface 126 of the support 120. It will be understood that the bristles, directional fabric or blastomeric material could be applied directly to a solid outer surface 124 of the support 130 by means of adhesive or by other fastening techniques. Also two or more different types of cleaning elements 130, such as bristles surrounding on one or two opposed sides with a squeegee blade or blades. The bristles can also be combined with the blastomeric material or the directional fabric.

As shown in FIG. 13, the support 120 may be provided with a recess 132 from the outer surface 126 to an inset inner surface 134. The recess 132 forms a receptacle for receiving the cleaning element 130. One or more apertures 136 may optionally be formed in the inner surface 134 for receiving mounting studs or fasteners to fixedly attach the cleaning element 130 to the support 120.

A slightly different mount is shown in FIG. 14 in which a through aperture 138 is formed through the entire thickness of the support 120 from the outer surface 126 to the inner surface 124. A discontinuous lip 140 may be formed within the aperture 138. The lip 140 and the aperture 138 cooperate to define a mount for receiving a suitably formed substrate for the cleaning element 130 which can snap into the discontinuities in the lip 140 and be supported on the remaining portions of the lip 140 within the aperture 138.

The brush/roller 100 provides multiple cleaning functions. First, the tape roll 30 can be removed thereby exposing the directional fabric 36 for separate use. With the tape roll 30 installed over the bearing surfaces 110 and 112, the tape roll 30 can be used in a conventional manner. In addition, the cleaning element 130 on the support 120 may be employed at any time to remove lint, hair or other debris from surfaces, animals, clothing, etc.

It will also be understood that the handle 104 may be formed with an internal fluid containing chamber coupled to a dispenser or nozzle mounted at one end of the handle 104, as described hereafter, to provide for selective dispensing of cleaning fluid.

Referring now to FIGS. 11–14, the assembly 140 shown in FIGS. 11–14 shares common elements with the assembly 100 described above and shown in FIGS. 8–10. Thus, the same reference numbers depict the handle portion 104, the support 120, the opposed surfaces 124 and 126 of the support 120, and the cleaning element 130 mounted on the outer surface 126 of the support 120.

In this aspect, the support section differs from the support section 106 described above in that it is formed of opposed support members 142 and 144. The support members 142 and 144 are spaced apart. The support member 102 can be integrally formed or joined as a separate member to the transition portion 116 between the handle 104 and the support member 142. The opposite support member 144 is carried on a wall 145 which extends from one end of the support 120.

The supports 142 and 144 are in the form of generally circular bearing elements 146 and 148, respectively, which are adapted to rotatably or fixedly receive a lint roll 30 therebetween. The bearing elements 146 and 148 have a diameter or shape to engage the inner diameter of the lint roll 30, regardless of whether the lint roll 30 is of the core or coreless type.

The construction of the support 120 and the cleaning element 130 is identical to that described above and will not be repeated for the assembly 140.

The apparatus 140 provides multiple, independent, cleaning functions via a rotatably or fixed mounted lint roll 30, the cleaning element 130 on the support 120 or even by the addition of a fluid container within the handle 104 and an integrally attached spray dispenser, as described hereafter.

Figure 15:
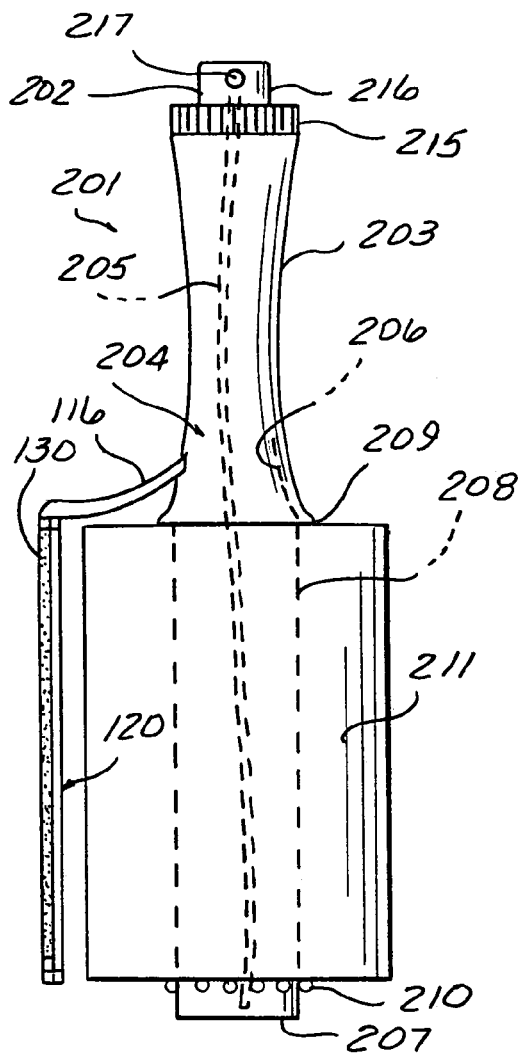
FIG. 15 is a side elevational view of a combination lint roller/brush assembly and spray dispenser apparatus according to one aspect of the present invention with the tape roll in place.

With reference first to FIG. 15, one aspect of the combined lint remover and spray dispenser apparatus 201 is shown as including a liquid dispensing means, such as a spray pump cap 202, which threadingly engages one end of an elongated handle section 203 of a liquid storage container 204. A liquid transferring tube 205 running substantially through the interior of a hollow chamber 206 within the container 204 which receives and stores a liquid solution. The container 1 is formed of a base portion 207 and an integral, elongated neck portion forming the handle section 203, which together define the hollow chamber 206. A support section 208 has a top bead or rim portion 209 and outwardly extending protrusions 210, which lock a tape roll 211 in place. The tape roll 211 may be formed by conventional methods of an elongated single piece of outwardly facing adhesive or, more typically, a plurality of end to end arranged, separatable strips wound in a roll about a hollow center. Each sheet is separable from the tape roll 211 when soiled or dirty to expose an underlying clean adhesive strip. An example of a lint remover tape roll can be found in U.S. Pat. No. 4,361,923.

The handle portion 203 may have a generally constant diameter, cylindrical shape or, more preferably, a smoothly curved concave shape for easy grasping by the user for use of the lint remover roll 211 or the dispenser 202.

The support section 208 about which the tape roll 211 is mounted, may have a reduced diameter from the major diameter of the handle 203. Alternately, the support section 208 may have the same diameter as the handle 203. The rim portion 209 flares radially outward from the support section 208 to form a shoulder for supporting one end of the tape roll 211 as shown in FIG. 15. The tape roll 211, which has a hollow bore extending therethrough, is urged from one end over the projections 210 and about the support section 208 on the container 201 until the opposite end of the tape roll 211 seats against the shoulder 209. At this time, the trailing end of the tape roll 211 is located inside of the projections 210 so that the tape roll 211 is rotatably mounted on the support section 208.

The hollow container 201 is formed preferably of one piece utilizing a blow molding process and materials such as polyethylene, PET, polyvinyl chloride, or similar thermoplastic material. The lint tape roll support section 208, framed by upper and lower outwardly protrusions 209 and 210, has a diameter less than the inside diameter of the adhesive tape lint roll 211. Alternately, the container 201 can be formed of two halves joined together to form a sealed member.

In order to mount the pump spray type liquid dispenser 202 to the container 201, the pump sprayer 202 has a cap 215 for threaded engagement with the top of the elongated handle section to securably seal to the container 201. Alternately, the cap 215 may be configured for a snap-on engagement with a projection on an end portion of the handle 203. The pump sprayer type dispenser 202 includes a hose extending from the pump sprayer 202 into the container 201 for carrying the liquid contents to the spray or trigger nozzle 217.

Alternately, the pump spray type liquid dispenser cap 215 and nozzle 217 can be replaced by a known trigger handle operated pump dispenser.

Figure 16:
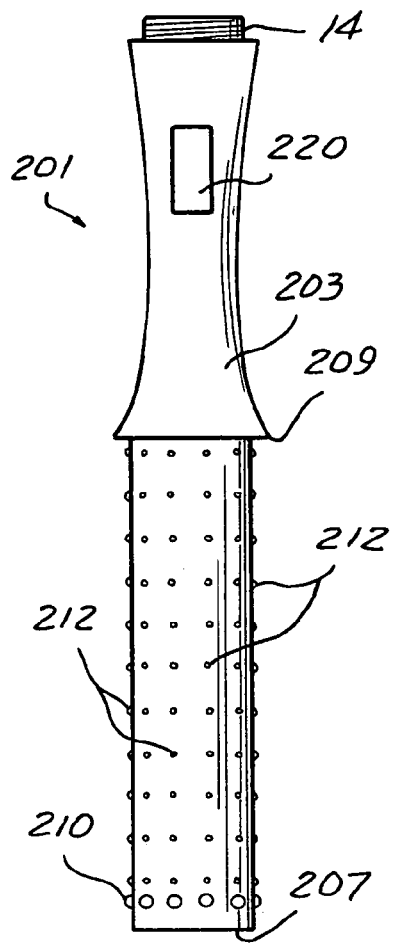
FIG. 16 is a side elevational view of the apparatus of FIG. 15 without the tape roll and without a pump dispensing sprayer.

As shown in FIG. 16, the optional support 120 may be connected to the handle 203 by means of the transition portion 116. As described above, the support 120 supports an auxiliary cleaning element 130, such a bristles, sponge rubber, directional fabric, etc.

As shown in FIG. 16, exterior threads 214 are formed on one end of the container 201 for receiving the threaded cap 215 carrying a push type spray head 216 with a dispenser nozzle 217 carried therein. The tube 205 is connected at one end to the dispenser nozzle 217 and extends through the container 201 preferably into close proximity with the base 207. A spring, not shown, may be mounted within the head 216 for returning the head 216 to the outward disposed position shown in FIG. 15 after each spray dispensing depression.

In order to rotatably mount and secure the tubular cylindrical adhesive tape lint roll 211 to the lint support section 208, a plurality of circumferentially spaced, radially outwardly facing protrusions 210, such as flexible fingers, beads, solid or broken bands, are formed at the end or bottom of the support section 208 opposite or perpendicular to the handle 203. These flexible fingers, beads, or bands 210 have an outside diameter greater than the inside diameter of the lint roller 211 such that with the lint roller 211 inserted over the lint roller support 208, the flexible fingers, beads, solid or broken bands 210, extend outwardly along the bottom end of the support section 208 entrapping the lint tape roll 211 within the top and bottom ends of the support section 208. The protrusions, fingers, beads, partial or solid bands 210 can be substantially flexible so as to flex to permit the installation and removal of the tape roll 211 onto the roller support 208.

In order to minimize the frictional contact between the support section 208 and the adhesive lint tape roll 211, a plurality of outwardly facing ribs or nibs 212 are optionally formed along the outer periphery of the support section 208. By minimizing the contact area between the inner wall of the tape roll 211 and the support section 208 utilizing the ribs or nibs 212, only minimal frictional contact occurs between the interior of the lint tape roll 211 and outer periphery of the lint roller support section 208, thereby encouraging free rotation of the lint roller 211 about the support 208. These raised ribs or nibs 212 may also strengthen the lint roller support section 208.

The lint remover 201 is operated with one hand while the tape roll 211 resolves to pick up lint, fuzz, pet hair, etc. from surfaces and to provide for dispensing liquid solutions as needed to completely treat the surface.

A panel or logo area 220 can optionally be formed on the exterior of the handle section 203 for receiving a decoration, logo or product advertisement.

Figure 18:
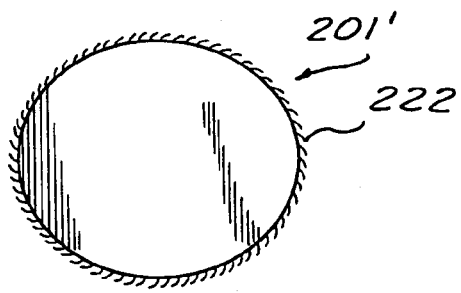
FIG. 18 is a bottom view of the apparatus shown in FIG. 17 with the directional lint removal fabric attached 360 degrees around the support section.
Figure 19:
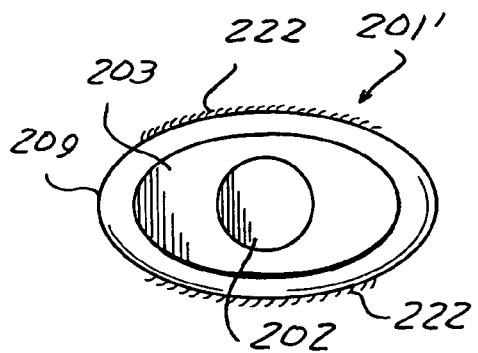
FIG. 19 is a top view of the apparatus of FIGS. 15–18, but with an oblong handle and oblong support section with directional lint removal fabric attached partially around the support section.

FIGS. 17, 18 and 19 depict alternate aspects of the present apparatus. In FIG. 17, the container 201 is formed essentially the same as the container 201 shown in FIGS. 15 and 16 and described above. However, in this aspect of the invention, a lint remover means is in the form of a sheet of directional lint removing fabric 222. The fabric sheet 222 may be permanently or releasably mounted about the support section 208 by a suitable adhesive. Other mounting means, including fasteners, Velcro, sonic or mechanical bonding, etc., may also be employed. It should also be noted that in this aspect of the present invention, the shoulder 209 and projections 210 may not be required.

The fabric 222 is a dimensional woven nylon pile velvet created by cutting intertwined yard threads. The pile surface is heat set in a specific direction to guarantee directional uniformity. This enables the sheet 222 to be drawn in one direction across a surface to be cleaned to pick up lint and other debris from the surface. Dragging the sheet 222 in an opposite direction about another surface removes any collected lint and debris from the sheet 222.

As shown in FIG. 15, the optional support 120 may be connected to the handle 203 by means of the transition portion 116. As described above, the support 120 supports an auxiliary cleaning element 130, such a bristles, sponge rubber, directional fabric, etc.

FIG. 18 depicts a bottom view of another aspect of a container 201'. In this aspect, the container 201' has a generally oval shape with the directional lint remover fabric 222 disposed substantially completely 360° about the exterior of the container 222.

In FIG. 19, a container 201' has a more elongated, oblong shape.

Referring now to FIG. 20, there is depicted another aspect of a combined lint remover and spray liquid dispenser 230 which includes essentially the same elements as the container 201, but has the elements disposed in a different external configuration or shape. Thus, the container 230 includes a handle 232 and a lint roll support 234. In this aspect, however, the handle 232 includes one or more bends, to the axial extent of the support 34, with one bend at substantially 90° being shown in FIG. 20 by example.

The optional support 120 may be connected to the handle 203 by means of the transition portion 116. As described above and shown in FIG. 16, the support 120 supports an auxiliary cleaning element 130, such a bristles, sponge rubber, directional fabric, etc.

Figure 22:
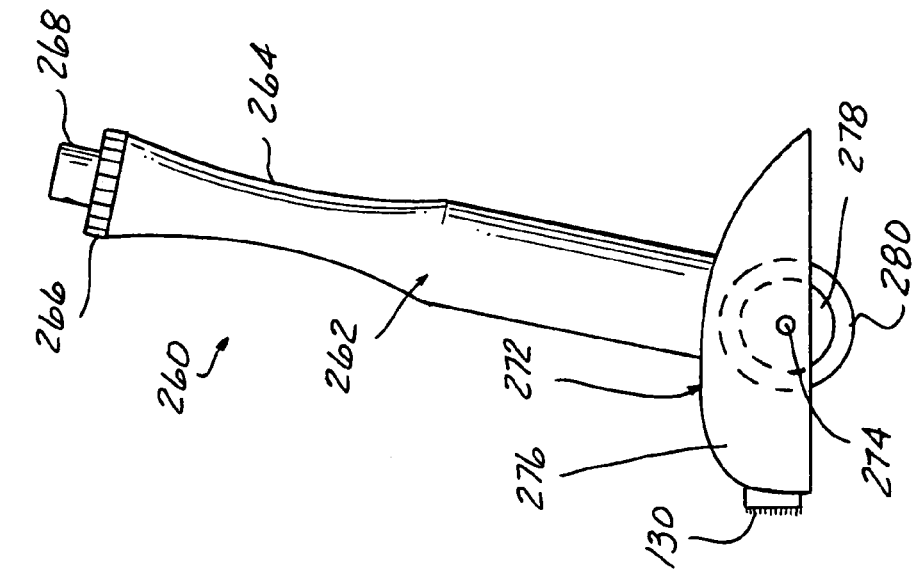
FIG. 22 is a side elevational view of the apparatus shown in FIG. 21.
Figure 21:
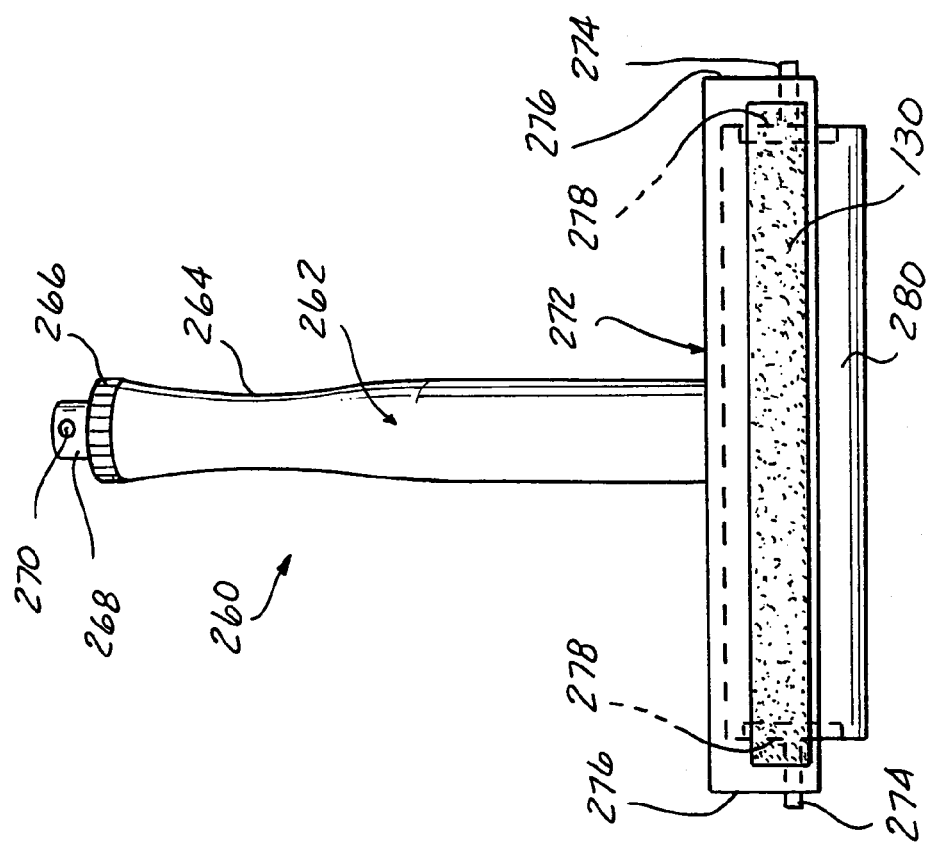
FIG. 21 is a front elevational view of yet another aspect of the apparatus of the present invention.

Referring now to FIGS. 21 and 22, there is depicted another aspect of the present apparatus 260 which also includes a handle shaped, hollow container 262 having a handle portion 264, a dispensing container cap 266, a dispensing head 268 and a dispenser nozzle 270. In this aspect, a support 272 is mounted by integral molding or by means of separate fasteners, threads, etc., to one end of the container 262. The support 272 is in the form of a hood having a generally semi-circular shape with a hollow interior or internal recess. A pair of hinge pins 274 are mounted in opposed sides 276 of the support 272 and rotatably receive end caps 278 mounted in an elongated tape roll 280. In this manner, the tape roll 280 is rotatably mounted within the support or hood 272.

The hood 272 forms a convenient surface for receiving the cleaning element 130. The hood 272 can have the cleaning element 130 affixed thereto by adhesive or by any of the attachment methods shown in FIGS. 12–14.

Figure 23:
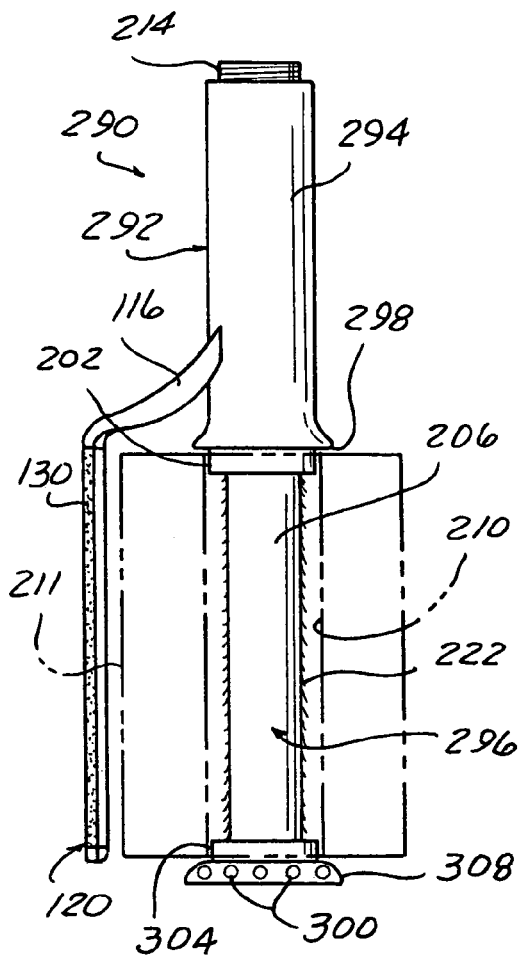
FIG. 23 is a side elevational view showing another aspect of the present apparatus.

In FIG. 23, a lint remover and spray dispenser apparatus 290 is depicted. The apparatus 290 combines the features of the removable and rotatable lint remover roll 211 and hollow container 201 shown in FIGS. 15 and 16 with the directional fabric 222 support shown in FIGS. 17–19. Thus, elements of the apparatus 290 are common with the previous apparatus 201. Specifically, the apparatus 90 includes a hollow container 292 having a handle 294 and a lint remover material support 296. A shoulder 298 is formed intermediate the handle 294 and the support 296. A plurality of outwardly extending projections or nibs 300 are formed on an opposite end of the support 296.

The support 296 is formed with opposed ends 302 and 304 of a first diameter and an intermediate portion 306 of a slightly smaller or reduced diameter. A radially enlarged or flared end 308 is formed at one end of the support section 306 and carries the projections 300. The inner diameter 310 of the lint remover roll 211 is rotatably supported on the larger diameter end portions 302 and 304 of the support section 296 to enable the lint remover roll 211 to rotate about the support section 296. At the same time, the directional fabric 222 is adhesively or otherwise fixedly mounted on the reduced diameter intermediate portion 306 of the support section 296 so as to be located out of contact with the inner diameter 310 of the lint remover roll 211.

The cap 215 with the depressable head 216 and dispenser nozzle 217, as shown in FIG. 1 may be fixedly attached to one end of the handle 294 via the threads 214, by example only.

In this manner, the apparatus 290 is capable of simultaneously carrying the directional lint removal fabric 222 and a rotatable lint remover roll 211. The lint remover roll 211 is removed from the support 226 to enable the directional fabric 222 to be used to remove lint and debris from various surfaces.

As shown in FIG. 15, the optional support 120 may be connected to the handle 294 by means of the transition portion 116. As described above, the support 120 supports an auxiliary cleaning element 130, such a bristles, sponge rubber, directional fabric, etc.

Figure 24:
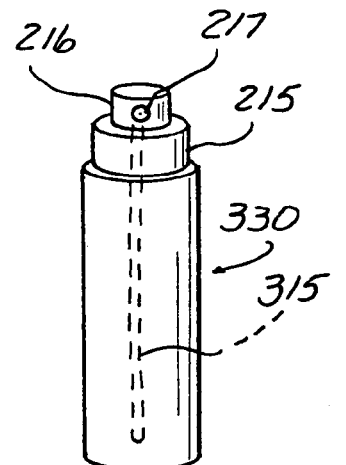
FIG. 24 is an exploded, perspective view of yet another aspect of the present apparatus.
Figure 24:
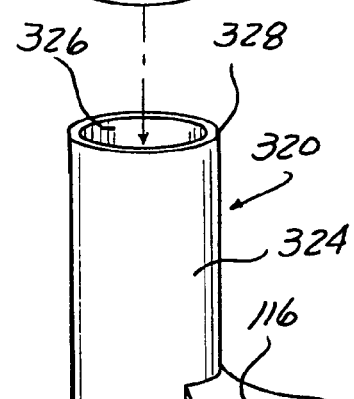
Figure 24:
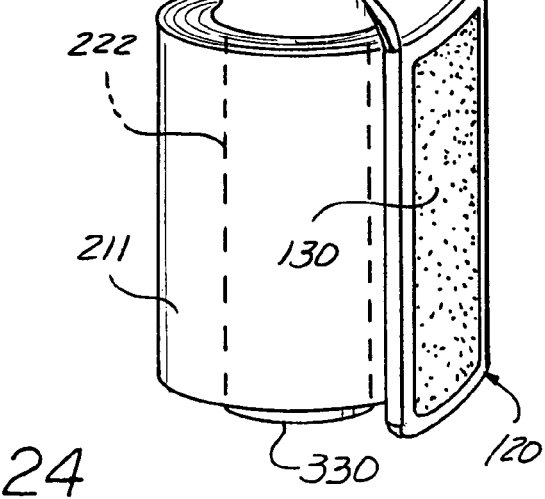

A further modification to any or all of the apparatus described above is depicted in FIG. 24. It will be understood that although FIG. 24 depicts the apparatus 320 as carrying a lint remover roll 211, the apparatus 320 can also be designed for independent or simultaneous mounting of the directional fabric 222 about a support section 322.

In this aspect of the invention, the handle portion 324 of the apparatus 320 may have an enlarged diameter with an open ended bore 326 extending from one end 328. The opposite end 330 of the apparatus 320 may be opened or closed.

The diameter of the bore 326 is sized to removably receive a liquid dispenser container or bottle 330. The bottle 330 includes, by example only, a removable cap 215 which carries a depressable head 216 and nozzle 217. The inner dispenser tube 315 extends through the interior of the container 330.

The container 330 can be a conventional liquid cleaner supplied with the apparatus 320 or purchased separately therefrom. Regardless of how the container 330 is formed, the container 330 is removably insertable into the handle 324 through the open ended bore 326 to a distance which disposes the depressable spray dispenser head and nozzle 217 externally of the first end 328 of the handle 324.

A shoulder, not shown, may be provided within the interior of the bore 326 to limit the insertion distance of the container 330 into the bore 326.

The optional support 120 may be connected to the handle 324 by means of the transition portion 116. As described above, the support 120 supports an auxiliary cleaning element 130, such a bristles, sponge rubber, directional fabric, etc.

Another aspect of the present apparatus is shown in FIG. 25 and is a modification to the apparatus 201 shown in FIGS. 15 and 16. As shown in FIG. 13, a combined lint remover and spray dispenser apparatus 350 includes a body 352 which is preferably hollow. The body 352 has a handle portion 354, an intermediate portion supporting a lint removal roll, such as tape roll 311 either in a fixed or rotatable manner, and an end 356, opposite from the handle 354 which receives a liquid dispensing means, such as a spray pump cap 358. The spray pump cap 358 is threadingly engaged or snap connected to the end 356 of the body 352.

A liquid storage chamber is formed within the body 352 extending from the end 356 through at least the intermediate portion supporting the tape roll 311 and, optionally, substantially through all of the handle 354.

The optional support 120 may be connected to the body 352 by means of the transition portion 116. As described above, the support 120 supports an auxiliary cleaning element 130, such a bristles, sponge rubber, directional fabric, etc.

Figure 26:
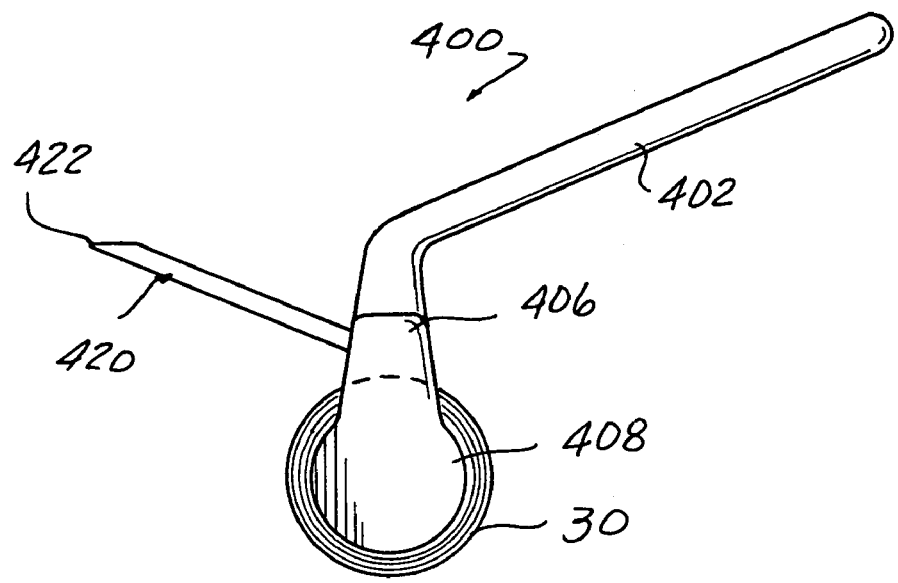
FIG. 26 is a side elevational view of another aspect of the present apparatus.
Figure 27:
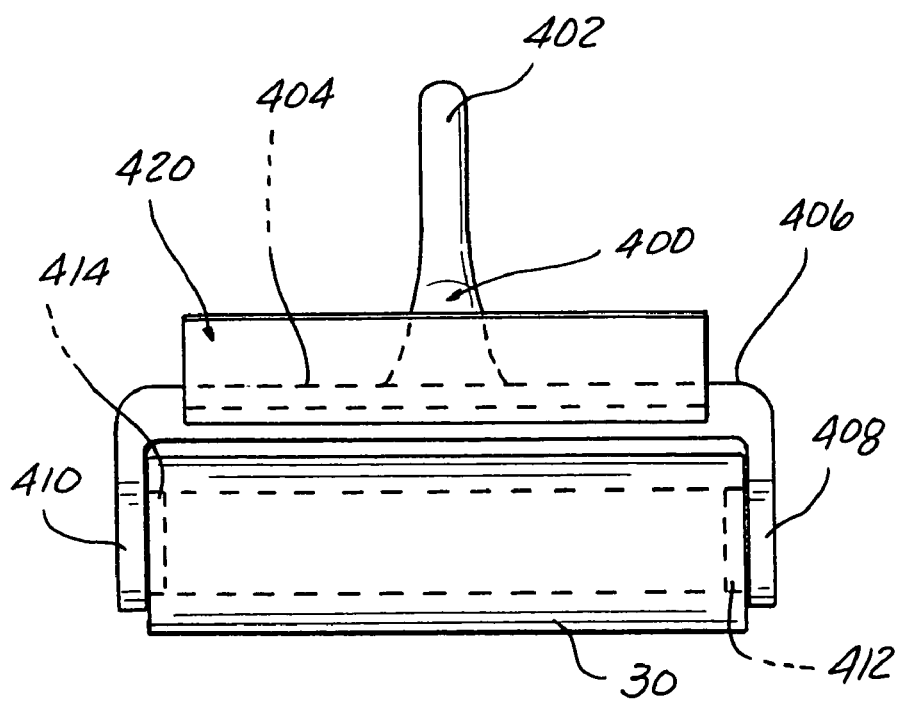
FIG. 27 is a front elevational view of the aspect of the present apparatus shown in FIG. 26.

Referring now to FIGS. 26 and 27, there is depicted yet another aspect of the present lint roller/brush apparatus denoted generally by reference number 400. The apparatus 400 includes a body which may be integrally formed, such as from a blow molded plastic, or assembled of individual components fixedly joined together into unitary structure by heat or sonic welding, fasteners, etc.

The apparatus 400 includes an elongated handle 402 which has an ergonomic shape for easy hand gripping. Alternately, the handle 302 may be formed with a hollow interior chamber suitable for receiving a cleaning liquid. A dispenser, similar to the dispensers described above and shown in FIGS. 15–25 may be mounted on the end of the handle 402.

A further optional adaptation is the provision of snap or screw together, threaded connections on the end of the handle 402 for connection to an elongated handle or handle extension, not shown, to enable the apparatus 400 to be conveniently used to clean floors, walls, ceilings, or other hard to reach surfaces.

The handle 402 transitions into a cross member formed of two cross arms 404 and 406 which extend laterally in opposite directions from the end of the handle 402. The arms 404 and 406 terminate in angularly disposed legs 408 and 410, respectively. A pair of generally circular supports 412 and 414 extend axially inward from the legs 408 and 410, respectively, and rotatably fit within the inner diameter of the lint roll 30 which can be snapped over the supports 412 and 414 for insertion or removal from the apparatus 400.

In this aspect, an additional cleaning element in the form of a squeegee 420 is fixedly mounted in the arms 404 and 408 and projects angularly therefrom as shown in FIG. 26. The squeegee 420 has a blade-like shape formed of a resilient, flexible material terminating in one or more pointed edges 322 which, when dragged across the surface, is and are capable of pulling embedded hairs from fabric.

In summary, there has been disclosed numerous aspects of a combination lint roll/brush apparatus which is useful in efficiently removing dirt, debris, embedded hair, from fabrics and other surfaces. The apparatus combines several cleaning elements into a single apparatus thereby affording many different cleaning uses with a single apparatus. This enables different types of debris to be successfully removed from fabrics, furniture, clothing, and other surfaces by choosing one or more of the different cleaning elements in a single cleaning operation.

What is claimed is:

1. A lint/roller brush apparatus comprising:
a body having a handle and a support portion;
a selectively removable rotatable tape roll;
said support portion selectively supporting said rotatable tape roll thereabout; and
circumferentially spaced ribs disposed along said support portion for facilitating rotation of said tape roll;
wherein said support portion including said ribs has an outer diameter equal to an inner diameter of said rotatable tape roll;
wherein said support portion includes a plurality of fingers at one end thereof for selectively capturing said supported tape roll.

2. The apparatus of claim 1, wherein said support portion is tubular in configuration.

3. The apparatus of claim 1, wherein said tape roll comprises a plurality of outwardly facing adhesive sheets or strips wound in a roll in which the outermost sheet or strip is peelable one at a time.

4. The apparatus of claim 1, wherein said fingers extend radially outward from said support portion.

5. The apparatus of claim 1, wherein said roll includes an inner sleeve for frictionally contacting the ribs disposed along said support portion.

6. The apparatus of claim 1, wherein said ribs are longitudinally extending along the support portion.

7. The apparatus of claim 1, wherein said ribs have a radius of curvature substantially smaller then the inner radius of said rotatable tape roll thereby providing a small contacting surface between said rotatable tape roll and said ribs.

8. A lint/roller brush apparatus comprising:
a body having a handle and a support portion;
a base from which said handle extends at one end and said support potion extends at the other end;
a selectively removable rotatable tape roll;
said support portion selectively supporting said rotatable tape roll thereabout; and
circumferentially spaced ribs disposed along said support portion for facilitating rotation of said tape roll;
wherein said support portion including said ribs has an outer diameter equal to an inner diameter of said rotatable tape roll; and
wherein said base tapers inwardly in configuration between said support portion and said handle.

9. The apparatus of claim 8, wherein said tape roll comprises a plurality of outwardly facing adhesive sheets or strips wound in a roll in which the outer most sheet or strip is peelable one at a time.

10. The apparatus of claim 8, wherein said roll includes an inner sleeve for frictionally contacting the ribs disposed along said support portion.

11. The apparatus of claim 8, wherein said ribs are longitudinally extending along the support portion.

12. A lint/roller brush apparatus comprising:
a body having a handle and a support portion;
a handle support extending from said support portion for receiving said handle;
a selectively removable rotatable tape roll;
said support portion selectively supporting said rotatable tape roll thereabout; and
circumferentially spaced ribs disposed along said support portion for facilitating rotation of said tape roll;
wherein said support portion including said ribs has an outer diameter equal to an inner diameter of said rotatable tape roll,
wherein said handle is formed with a bore extending therethrough; and
wherein said bore has a smaller diameter bore portion at one end for reception of said handle support and a second larger diameter bore portion at the other end.

13. The apparatus of claim 12, further including an end cap coupled to said handle.

14. The apparatus of claim 13, wherein said end cap includes a shank for reception in said larger bore portion of said handle.

15. The apparatus of claim 12, wherein said roll includes an inner sleeve for frictionally contacting the ribs disposed along said support portion.

16. The apparatus of claim 12, wherein said ribs are longitudinally extending along the support portion.

17. A lint/roller brush apparatus comprising:
a body having a handle and a support portion;
a selectively removable rotatable tape roll;
said support portion selectively supporting said rotatable tape roll thereabout; and
circumferentially spaced ribs disposed along said support portion for facilitating rotation of said tape roll;
wherein said support portion including said ribs has an outer diameter equal to an inner diameter of said rotatable tape roll;
wherein said handle has an end cap coupled thereto, and wherein said end cap includes a hanger portion.

18. The apparatus of claim 17, wherein said end cap includes a shank for reception in a bore of said handle.

19. The apparatus of claim 17, wherein said end cap has at least one end with a decorative shape.

20. The apparatus of claim 17, wherein said roll includes an inner sleeve for frictionally contacting the ribs disposed along said support portion.

* * * * *